United States Patent
Park et al.

(10) Patent No.: US 10,553,835 B2
(45) Date of Patent: Feb. 4, 2020

(54) BATTERY CELL HAVING MEANS FOR PREVENTING SHORT-CIRCUIT

(71) Applicant: LG CHEM, LTD., Seoul (KR)

(72) Inventors: Chan Ki Park, Daejeon (KR); Dong-Myung Kim, Daejeon (KR); Sang Baek Ryu, Daejeon (KR); Jung Shik Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 85 days.

(21) Appl. No.: 15/033,438

(22) PCT Filed: Oct. 22, 2014

(86) PCT No.: PCT/KR2014/009923
§ 371 (c)(1),
(2) Date: Apr. 29, 2016

(87) PCT Pub. No.: WO2015/080380
PCT Pub. Date: Jun. 4, 2015

(65) Prior Publication Data
US 2016/0276632 A1    Sep. 22, 2016

(30) Foreign Application Priority Data
Nov. 26, 2013 (KR) .................. 10-2013-0144353

(51) Int. Cl.
*H01M 2/30* (2006.01)
*H01M 2/34* (2006.01)
(Continued)

(52) U.S. Cl.
CPC .......... *H01M 2/028* (2013.01); *H01M 2/0287* (2013.01); *H01M 2/30* (2013.01);
(Continued)

(58) Field of Classification Search
CPC ...... H01M 2/02; H01M 2/028; H01M 2/0267; H01M 2/0275; H01M 2/0287; H01M 2/30; H01M 2/40; H01M 10/0587
See application file for complete search history.

(56) References Cited

U.S. PATENT DOCUMENTS 4,818,588 A * 4/1989 Okabe ................. B29C 61/0616
428/201
5,747,192 A * 5/1998 Hughen .................... G09F 3/04
156/85
(Continued)

FOREIGN PATENT DOCUMENTS

CN        1805204 A      7/2006
CN      101765931 A      6/2010
(Continued)

OTHER PUBLICATIONS

Kim et al. KR 2013/0122550. Nov. 7, 2013. English machine translation/.*
(Continued)

*Primary Examiner* — James Lee
(74) *Attorney, Agent, or Firm* — Birch, Stewart, Kolash & Birch, LLP

(57) ABSTRACT

Disclosed herein is a battery cell configured such that an electrode assembly, including a positive electrode, a negative electrode, and a separator interposed between the positive electrode and the negative electrode, is mounted in a receiving part formed in a battery case, a positive electrode terminal and a negative electrode terminal protrude from at least one side of the electrode assembly, and an insulative material is provided between the electrode assembly and the battery case.

8 Claims, 4 Drawing Sheets

(51) Int. Cl.
   *H01M 10/0587*   (2010.01)
   *H01M 2/02*   (2006.01)
   *H01M 10/0525*   (2010.01)

(52) U.S. Cl.
   CPC ......... *H01M 2/34* (2013.01); *H01M 10/0587* (2013.01); *H01M 10/0525* (2013.01); *H01M 2200/00* (2013.01)

(56) References Cited

U.S. PATENT DOCUMENTS

| | | | |
|---|---|---|---|
| 6,294,287 | B1 | 9/2001 | Lee et al. |
| 2003/0072994 | A1* | 4/2003 | Goushu ............... H01M 2/0207 429/127 |
| 2004/0253512 | A1 | 12/2004 | Watanabe et al. |
| 2008/0008927 | A1 | 1/2008 | Lee et al. |
| 2008/0241680 | A1* | 10/2008 | Lee ...................... H01M 2/021 429/185 |
| 2013/0196215 | A1 | 8/2013 | Karatsu et al. |
| 2014/0335401 | A1 | 11/2014 | Wöhrle et al. |

FOREIGN PATENT DOCUMENTS

| | | |
|---|---|---|
| CN | 103168377 A | 6/2013 |
| CN | 103325987 A | 9/2013 |
| DE | 102012206075 A1 | 6/2013 |
| JP | 2003-507857 A | 2/2003 |
| JP | 2004-319156 A | 11/2004 |
| JP | 2005-158264 A | 6/2005 |
| KR | 10-2008-0018474 A | 2/2008 |
| KR | 10-1136799 B1 | 4/2012 |
| KR | 10-2012-0048463 A | 5/2012 |
| KR | 10-2012-0058876 A | 6/2012 |
| KR | 10-2013-0122550 A | 11/2013 |

OTHER PUBLICATIONS

"Tape". www.merriam-webster.com/dictionary/tape. Web. (Year: 2018).*
International Search Report issued in PCT/KR2014/009923, dated Jan. 26, 2015.
Extended European Search Report for European Application No. 14866202.6, dated Apr. 12, 2017.

* cited by examiner

[FIG. 1] Prior Art
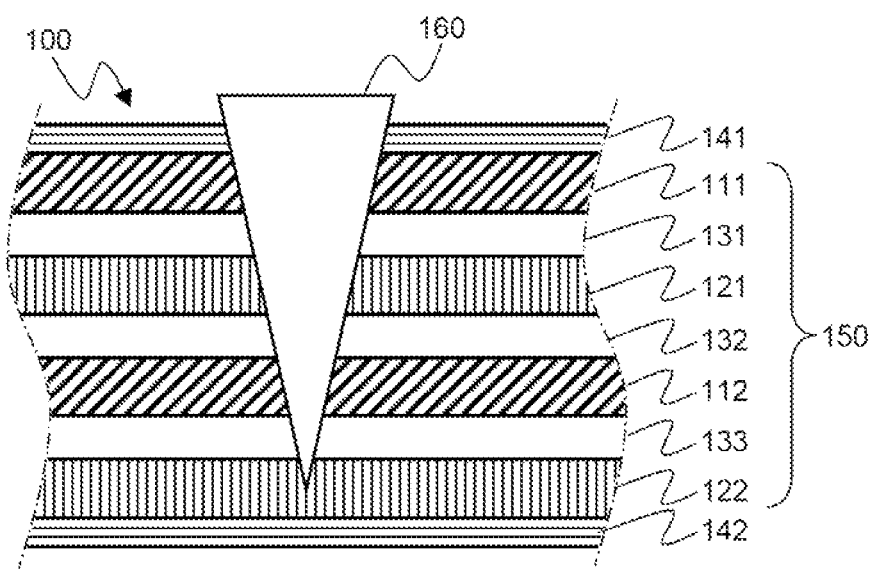

[FIG. 2]
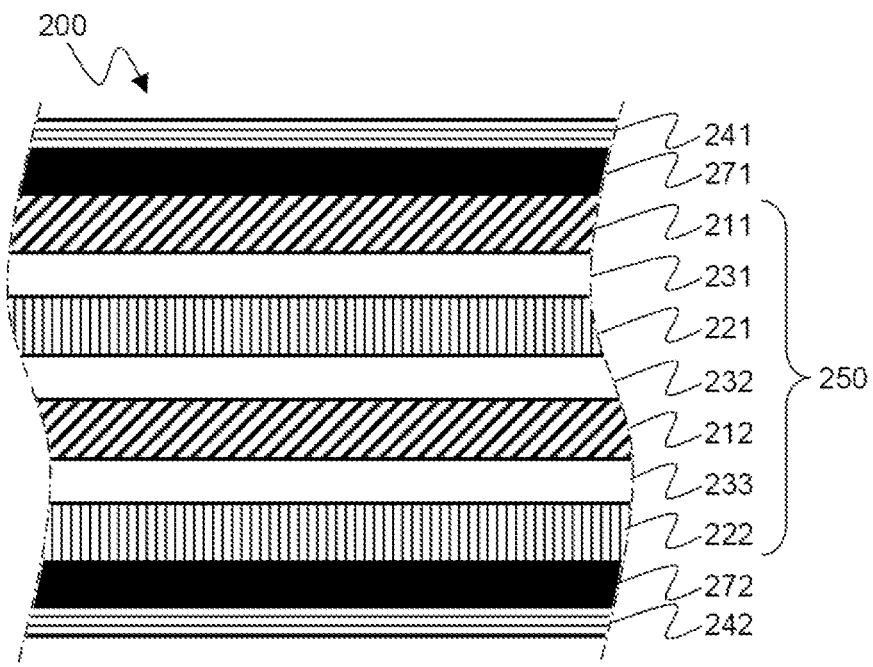

[FIG. 3]
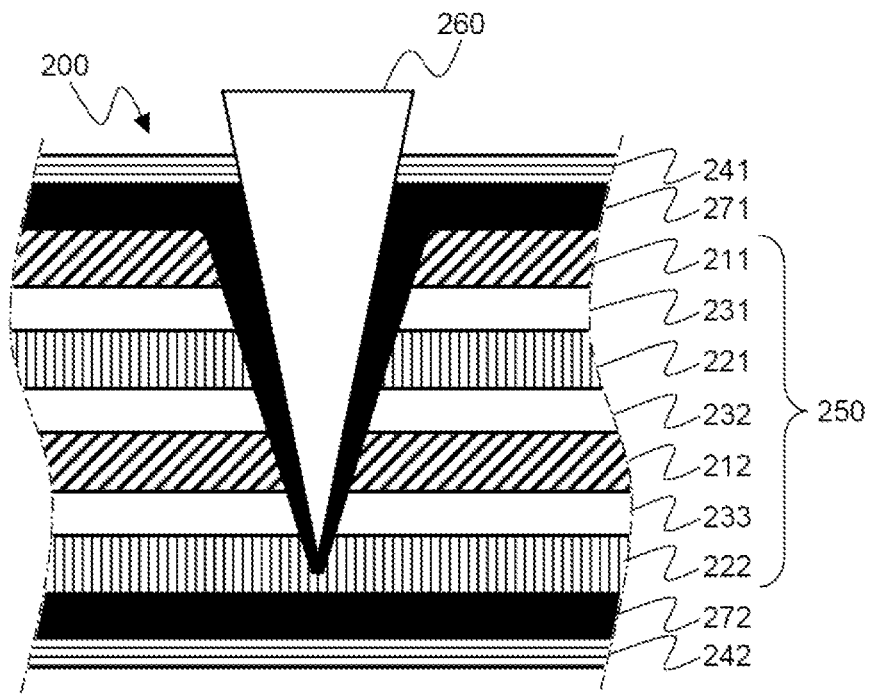

[FIG. 4]
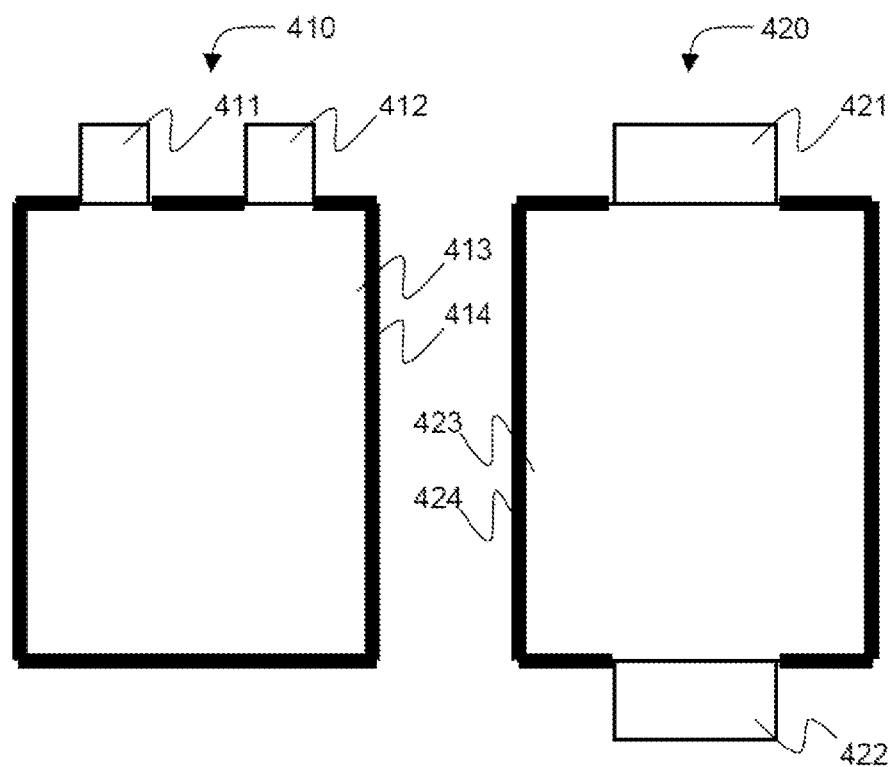

BATTERY CELL HAVING MEANS FOR PREVENTING SHORT-CIRCUIT

TECHNICAL FIELD

The present invention relates to a battery cell having a means for preventing short-circuit.

BACKGROUND ART

As energy prices increase due to the depletion of fossil fuels and concern over environmental pollution escalates, the demand for environmentally-friendly alternative energy sources is bound to play an increasing role in the future. Thus, research into techniques for generating various kinds of powers, such as nuclear energy, solar energy, wind energy, and tidal power, is underway, and power storage apparatuses for more efficient use of the generated energy are also drawing a lot of attention.

In particular, the demand for batteries as energy sources is rapidly increasing as mobile device technology continues to develop and the demand for mobile devices continues to increase. Accordingly, a lot of research on batteries capable of satisfying various needs has been carried out.

In terms of the shape of batteries, the demand for prismatic secondary batteries or pouch-shaped secondary batteries thin enough to be applied to products, such as cellular phones, is very high. In terms of the material for batteries, on the other hand, the demand for lithium secondary batteries, such as lithium ion batteries and lithium ion polymer batteries, which exhibit high energy density, discharge voltage, and output stability, is also very high.

In addition, secondary batteries may be classified based on the shape of a battery case of each of the secondary batteries into a cylindrical battery configured to have a structure in which an electrode assembly is mounted in a cylindrical metal container, a prismatic battery configured to have a structure in which an electrode assembly is mounted in a prismatic metal container, and a pouch-shaped battery configured to have a structure in which an electrode assembly is mounted in a pouch-shaped case made of a laminated aluminum sheet.

Particularly, in recent years, a lot of interest has been directed to a pouch-shaped battery configured to have a structure in which such a stacked or stacked/folded type electrode assembly is mounted in a pouch-shaped battery case made of a laminated aluminum sheet because of low manufacturing costs, light weight, easy modification of the shape thereof, etc. In addition, the use of such a pouch-shaped battery has gradually increased.

Furthermore, secondary batteries may be classified based on the structure of an electrode assembly, which has a structure in which a positive electrode and a negative electrode are stacked in a state in which a separator is interposed between the positive electrode and the negative electrode. For example, the electrode assembly may be configured to have a jelly-roll (wound) type structure in which a long sheet type positive electrode and a long sheet type negative electrode are wound in a state in which a separator is disposed between the positive electrode and the negative electrode or a stacked type structure in which pluralities of positive electrodes and negative electrodes each having a predetermined size are sequentially stacked in a state in which separators are disposed respectively between the positive electrodes and the negative electrodes. In recent years, in order to solve problems caused by the jelly-roll type electrode assembly and the stacked type electrode assembly, there has been developed a stacked/folded type electrode assembly, which is a combination of the jelly roll type electrode assembly and the stacked type electrode assembly, having an improved structure in which predetermined numbers of positive electrodes and negative electrodes are sequentially stacked in a state in which separators are disposed respectively between the positive electrodes and the negative electrodes to constitute a bi-cell or a full cell, after which a plurality of bi-cells or full cells is sequentially folded while being placed on a separation film.

One of the principal research projects for secondary batteries is to improve the safety of the secondary batteries. For example, a secondary battery may explode due to high temperature and pressure in the secondary battery which may be caused by an abnormal state of the secondary battery, such as internal short-circuit of the secondary battery, overcharge of the secondary battery with higher than allowed current or voltage, exposure of the secondary battery to high temperature, or deformation of the secondary battery due to drop of the secondary battery or external impact applied to the secondary battery.

Specifically, if a battery cell is damaged by a metal member penetrating into the battery cell from outside the battery cell, the metal member directly contacts electrodes of an electrode assembly, with the result that an internal short-circuit may occur in the battery cell or the battery cell may catch fire, thereby greatly reducing the safety of the battery cell.

FIG. 1 is a typical view schematically showing an example in which a conventional battery cell is locally damaged by a metal member.

Referring to FIG. 1, a battery cell 100 is configured to have a structure in which an electrode assembly 150, including positive electrodes 111 and 112 and negative electrodes 121 and 122 in a state in which separators 131, 132, and 133 are interposed respectively between the positive electrodes 111 and 112 and the negative electrodes 121 and 122, is mounted in battery cases 141 and 142. A portion of the battery cell 100 is damaged by a metal member 160, which has penetrated into the battery cell 100 from outside the battery cell 100.

The metal member 160 has broken through the battery case 141 and then penetrated into the battery cell 100, with the result that the electrode assembly 150 has been locally damaged. In this case, the positive electrodes 111 and 112 and the negative electrodes 121 and 122, which constitute the electrode assembly 150, directly contact the metal member 160. As a result, an internal short-circuit occurs in the battery cell 100, with the result that the battery cell may catch fire or explode.

Therefore, there is a high necessity for technology that is capable of fundamentally solving the above problems.

DISCLOSURE

Technical Problem

The present invention has been made to solve the above problems and other technical problems that have yet to be resolved. It is an object of the present invention to provide a battery cell having an insulative material provided between an electrode assembly and a battery case for preventing the occurrence of a short-circuit in the battery cell or combustion of the battery cell due to direct contact between electrodes of the electrode assembly and a metal member penetrating into the battery cell when the battery cell is damaged by the metal member, thereby improving the safety of the battery cell.

In addition, it is another object of the present invention to provide a battery cell to which an insulative material is applicable regardless of the shape of an electrode assembly and which achieves improved safety using a simple structure.

Technical Solution

In accordance with one aspect of the present invention, the above and other objects can be accomplished by the provision of a battery cell configured such that an electrode assembly, including a positive electrode, a negative electrode, and a separator interposed between the positive electrode and the negative electrode, is mounted in a receiving part formed in a battery case, a positive electrode terminal and a negative electrode terminal protrude from at least one side of the electrode assembly, and an insulative material is provided between the electrode assembly and the battery case.

In the battery cell according to the present invention, as described above, the insulative material is provided between the electrode assembly and the battery case. Consequently, it is possible to prevent the occurrence of a short-circuit in the battery cell or combustion of the battery cell due to direct contact between the electrodes of the electrode assembly and the metal member penetrating into the battery cell when the battery cell is damaged by the metal member, thereby improving the safety of the battery cell.

In addition, only the insulative material is provided at the outer surface of a conventional electrode assembly or the inner surface of a conventional battery case regardless of the shape of the electrode assembly. Consequently, it is possible to improve the safety of the battery cell using a simple structure.

In a concrete example, the insulative material may be provided between the electrode assembly and the battery case in a state in which the insulative material is in tight contact with the outer surface of the electrode assembly or the inner surface of the battery case.

If the insulative material is provided in the electrode assembly, e.g. between the positive electrode and the negative electrode, the flow of ions between the electrodes may be disturbed by the insulative material. If the insulative material is provided at the outer surface of the battery case, on the other hand, the insulative material is exposed outward. In this case, the insulative material may be weakened by contaminants, may be deteriorated, or may be worn. As a result, the battery case may be partially or entirely exposed outward, and therefore the insulative material may not exhibit desired effects.

According to the present invention, the insulative material is provided between the electrode assembly and the battery case in a state in which the insulative material is in tight contact with the outer surface of the electrode assembly, which faces the inner surface of the battery case, or the inner surface of the battery case, which faces the outer surface of the electrode assembly. As a result, the insulative material is located between the metal member and the electrodes of the electrode assembly when the battery cell is damaged by the metal member. Consequently, it is possible to prevent direct contact between the metal member and the electrodes of the electrode assembly, thereby preventing the battery cell from catching fire or exploding, thus improving the safety of the battery cell However, the present invention is not limited thereto. The insulative material may be provided on both the outer surface of the electrode assembly and the inner surface of the battery case.

In another concrete example, the insulative material may be entirely or partially provided at the remaining region of the electrode assembly, excluding the positive electrode terminal and the negative electrode terminal of the electrode assembly, between the electrode assembly and the battery case.

That is, the insulative material may be locally provided only at a region of the electrode assembly that is exposed outward and may thus be easily broken, or may be entirely provided at the remaining region of the electrode assembly excluding the positive electrode terminal and the negative electrode terminal of the electrode assembly, depending on the shape of a device to which the battery cell is applied.

In this case, the insulative material may be provided over 30 to 90%, preferably 50 to 70%, of the entire area of the outer surface of the electrode assembly or the inner surface of the battery case. In addition, the insulative material may have a thickness equivalent to 0.1 to 20%, preferably 5 to 10%, of the thickness of the electrode assembly.

If the insulative material is provided over less than 30% of the entire area of the outer surface of the electrode assembly or the inner surface of the battery case or if the insulative material has a thickness equivalent to less than 0.1% of the thickness of the electrode assembly, it is not possible to exhibit a desired short-circuit prevention effect. On the other hand, if the insulative material is provided at more than 90% of the entire area of the outer surface of the electrode assembly or the inner surface of the battery case or if the insulative material has a thickness equivalent to more than 20% of the thickness of the electrode assembly, it may be difficult to impregnate the electrode assembly with an electrolyte.

Specifically, when the battery cell is damaged by the metal member, the insulative material is elastically stretched into a shape surrounding the outer surface of the metal member, which has penetrated into the electrode assembly.

If the insulative material is provided over less than 30% of the entire area of the outer surface of the electrode assembly or the inner surface of the battery case, therefore, it is not possible to effectively prevent direct contact between the metal member and the positive and negative electrodes of the electrode assembly to thus exhibit a desired safety improvement effect, since the insulative material does not cover the entirety of the outer surface of the metal member, which has penetrated into the electrode assembly.

On the other hand, if the insulative material has a thickness equivalent to less than 0.1% of the thickness of the electrode assembly, the insulative material may be damaged depending on the shape or rigidity of the metal member, whereby it is not possible to exhibit a desired safety improvement effect.

Meanwhile, the insulative material is not particularly restricted so long as the insulative material is provided at the outer surface of the electrode assembly or the inner surface of the battery case in order to exhibit a desired short-circuit prevention effect and a desired safety improvement effect while not affecting the performance of the battery cell. For example, the insulative material may be insulative paint, Parafilm, foamed rubber, or a mixture thereof.

In this case, the insulative paint may be at least one selected from a group consisting of acrylonitrile-butadiene rubber (NBR), styrene butadiene rubber (SBR), isobutylene isoprene rubber (IRR), chloroprene rubber (CR), and ethylene propylene diene monomer (EPDM). The insulative paint may be applied to the outer surface of the electrode assembly or the inner surface of the battery case between the electrode assembly and the battery case.

In addition, the foamed rubber may be natural rubber or synthetic rubber. Specifically, the synthetic rubber may be at least one selected from a group consisting of styrene butadiene rubber, polychloroprene rubber, nitrile rubber, butyl rubber, butadiene rubber, isoprene rubber, ethylene propylene rubber, polysulfide rubber, silicone rubber, fluoro rubber, urethane rubber, and acrylic rubber.

The structure of the electrode assembly constituting the battery cell according to the present invention is not particularly restricted so long as the electrode assembly is configured to have a structure including a positive electrode, a negative electrode, and a separator interposed between the positive electrode and the negative electrode. Specifically, the electrode assembly may be configured to have a structure in which the positive electrode and the negative electrode are wound in a state in which the separator is interposed between the positive electrode and the negative electrode, a structure in which pluralities of positive electrodes and negative electrodes each having a predetermined size are sequentially stacked in a state in which separators are disposed respectively between the positive electrodes and the negative electrodes, or a structure in which pluralities of positive electrodes and negative electrodes each having a predetermined size are sequentially stacked in a state in which separators are disposed respectively between the positive electrodes and the negative electrodes to constitute a unit cell, after which a plurality of unit cells is sequentially folded while being placed on a separation film.

In addition, the structure of the battery case constituting the battery cell according to the present invention is not particularly restricted so long as the electrode assembly with the above-stated construction is received in the battery case together with an electrolyte. Specifically, the battery case may be a case configured to have a structure comprising a cylindrical or prismatic container and a cap loaded on the open upper end of the container or a pouch-shaped case made of a laminate sheet including a resin layer and a metal layer.

The kind of the battery cell according to the present invention is not particularly restricted so long as the battery cell exhibits a desired effect while being configured to have the above-described structure. In a concrete example, the battery cell according to the present invention may be a lithium secondary battery, such as a lithium ion battery or a lithium ion polymer battery, which exhibit high energy density, discharge voltage, and output stability.

The construction, structure, and manufacturing method of the battery cell, including the lithium secondary battery, are well known in the art to which the present invention pertains, and therefore a detailed description thereof will be omitted.

In accordance with another aspect of the present invention, there is provided a device including the battery cell with the above-stated construction. The device may be any one selected from a group consisting of a cellular phone, a tablet computer, a laptop computer, a power tool, an electric vehicle, a hybrid electric vehicle, a plug-in hybrid electric vehicle, and a power storage apparatus.

The device and apparatus are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a typical view schematically showing an example in which a conventional battery cell is locally damaged by a metal member;

FIG. 2 is a typical view showing the structure of a battery cell according to an embodiment of the present invention;

FIG. 3 is a typical view schematically showing an example in which the battery cell of FIG. 2 is locally damaged by a metal member; and FIG. 4 is a plan view typically showing regions of battery cells according to other embodiments of the present invention at which insulative elastic members are provided.

BEST MODE

Now, preferred embodiments of the present invention will be described in detail with reference to the accompanying drawings. It should be noted, however, that the scope of the present invention is not limited by the illustrated embodiments.

FIG. 2 is a typical view showing the structure of a battery cell according to an embodiment of the present invention, and FIG. 3 is a typical view schematically showing an example in which the battery cell is locally damaged by a metal member.

Referring to FIGS. 2 and 3, a battery cell 200 is configured to have a structure in which an electrode assembly 250, including positive electrodes 211 and 212 and negative electrodes 221 and 222 in a state in which separators 231, 232, and 233 are interposed respectively between the positive electrodes 211 and 212 and the negative electrodes 221 and 222, is mounted in battery cases 241 and 242, and insulative materials 271 and 272 are provided respectively between the electrode assembly 250 and battery cases 241 and 242.

If a metal member 260 penetrates into the battery cell 200 from outside the battery cell 200, a portion of the battery cell 200 may be damaged. Specifically, the metal member 260 may break through the battery case 241 and may then penetrate into the battery cell 200, with the result that the electrode assembly 250 may be locally damaged.

In this case, the insulative material 271, which is provided between the electrode assembly 250 and the battery case 241, is stretched into a shape surrounding the outer surface of the metal member 260, which has penetrated into the battery cell 200, based on the external shape of the metal member.

As a result, the insulative material 271 prevents direct contact between the metal member 260, which has penetrated into the battery cell 200, and the positive electrodes 211 and 212 and the negative electrodes 221 and 222, which constitute the electrode assembly 250 of the battery cell 200, thereby preventing the occurrence of an internal short-circuit in the battery cell 200 or preventing the battery cell 200 from catching fire, thus improving the safety of the battery cell 200.

FIG. 4 is a plan view typically showing regions of battery cells according to other embodiments of the present invention at which insulative elastic members are provided.

Referring to FIG. 4, a battery cell 410 according to the present invention is configured such that a positive electrode terminal 411 and a negative electrode terminal 412 protrude from one side of an electrode assembly 413, and another battery cell 420 according to the present invention is configured such that a positive electrode terminal 421 and a negative electrode terminal 422 protrude from opposite sides of an electrode assembly 423.

An insulative material 414 is provided between the electrode assembly 413 of the battery cell 410 and a case (not shown), and an insulative material 424 is provided between the electrode assembly 423 of the battery cell 420 and a case (not shown). Specifically, the insulative material 414 is provided at the remaining region of the electrode assembly 413, excluding the positive electrode terminal 411 and the negative electrode terminal 412 of the electrode assembly 413, between the electrode assembly 413 and the case, and the insulative material 424 is provided at the remaining region of the electrode assembly 423, excluding the positive electrode terminal 421 and the negative electrode terminal 422 of the electrode assembly 423, between the electrode assembly 423 and the case.

Even when the remaining regions of the battery cell 410 and 420, excluding the positive electrode terminals 411 and 421 and the negative electrode terminals 412 and 422, are locally damaged by a metal member, therefore, direct contact between the metal member and positive electrodes and negative electrodes may be prevented, thereby preventing the occurrence of internal short-circuits in the battery cells 410 and 420 or preventing the battery cells 410 and 420 from catching fire, thus improving the safety of the battery cells 410 and 420.

Example 1

A stacked type electrode assembly, configured to have a structure in which positive electrodes and negative electrodes are stacked in a state in which separators are interposed respectively between the positive electrodes and the negative electrodes, was manufactured. Subsequently, an insulative tape, made of Teflon, was wound to cover the upper surface, the lower surface, and the opposite side surfaces of the electrode assembly. Subsequently, the electrode assembly was received in a pouch-shaped aluminum battery case, and then the battery case was sealed to manufacture a battery cell.

Comparative Example 1

A battery cell was manufactured in the same manner as in Example 1 except that no insulative tape was wound to cover the upper surface, the lower surface, and the opposite side surfaces of an electrode assembly.

Experimental Example 1

The battery cells manufactured according to Example 1 and Comparative example 1 were connected to an external device. In a state in which an electrical conduction tester was connected to connections between the battery cells and the external device, a needle-shaped member having a diameter of 15.8 mm and a weight of 91.9 kg was dropped from a height of 610 mm in order to apply impact to the upper surfaces of the battery cells manufactured according to Example 1 and Comparative example 1. The impact test was carried out nine times on different regions of the battery cells manufactured according to Example 1 and Comparative example 1 to check whether internal short-circuits occurred in the battery cells due to direct contact between the needle-shaped member and the electrodes. The results are shown in Table 1.

TABLE 1

|  |  | Example 1 | Comparative example 1 |
|---|---|---|---|
| Internal short-circuit | First time | X | ◯ |
|  | Second time | X | ◯ |
|  | Third time | ◯ | X |
|  | Fourth time | X | ◯ |
|  | Fifth time | X | ◯ |
|  | Sixth time | X | ◯ |
|  | Seventh time | ◯ | ◯ |
|  | Eighth time | X | ◯ |
|  | Ninth time | X | ◯ |

It can be seen from Table 1 that, in the battery cell manufactured according to Example 1 of the present invention, configured to have a structure in which the insulative tape is wound to cover the upper surface, the lower surface, and the opposite side surfaces of the electrode assembly, the occurrence of internal short-circuits due to direct contact between the needle-shaped member and the electrodes is more frequently prevented that in the case of the battery cell manufactured according to Comparative example 1.

This is because, when the needle-shaped member penetrates into the battery cell, the insulative tape prevents direct contact between the needle-shaped member and the electrodes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in a battery cell according to the present invention, an insulative material is provided between an electrode assembly and a battery case. Consequently, it is possible to prevent the occurrence of a short-circuit in the battery cell or combustion of the battery cell due to direct contact between electrodes of the electrode assembly and a metal member penetrating into the battery cell when the battery cell is damaged by the metal member. In addition, the insulative material is applicable to the battery cell regardless of the shape of the electrode assembly. Furthermore, only the insulative material is provided on the outer surface of a conventional electrode assembly or the inner surface of a conventional battery case. Consequently, it is possible to improve the safety of the battery cell using a simple structure.

The invention claimed is:

1. A battery cell comprising:
   an electrode assembly including at least one positive electrode, at least one negative electrode, and a separator respectively interposed between each positive electrode and each negative electrode;
   a battery case having a receiving part between a first portion of the battery case and a second portion of the battery case, the battery case being a pouch-shaped case made of a laminate sheet comprising a resin layer and a metal layer;
   a first insulative material wound on an outer surface of the electrode assembly; and
   a second insulative material provided on an inner surface of the battery case, wherein the outer surface of the electrode assembly faces the inner surface of the battery case, wherein a positive electrode terminal and a negative electrode terminal of the electrode assembly protrude from at least one side of the electrode assembly, wherein the first and second insulative materials are configured to stretch into a shape surrounding an object when the object has penetrated the first portion of the battery case, the at least one positive electrode, the separator and the at least one negative electrode to prevent the occurrence of internal short-circuits due to direct contact between the object and any of the at least one positive electrode and the at least one negative electrode, wherein the first and second insulative materials are provided directly between a positive electrode of the at least one positive electrode and the first portion of the battery case and are provided directly between a negative electrode of the at least one negative electrode and the second portion of the battery case, wherein the first insulative material is an insulative tape that covers an upper surface, a lower surface and opposite side surfaces of the electrode assembly, wherein the positive electrode terminal and the negative electrode terminal of the electrode assembly are provided without the first and second insulative materials, wherein at least the first insulative material is provided over 30 to 90% of an entire area of the outer surface of the electrode assembly, wherein the first and second insulative materials are made of polytetrafluoroethylene (PTFE), and wherein the first and second insulative materials have a thickness equivalent to 5 to 10% of a thickness of the electrode assembly.

2. The battery cell according to claim 1, wherein the electrode assembly is configured to have a structure in which the at least one positive electrode and the at least one negative electrode are wound in a state in which the separator is interposed between the at least one positive electrode and the at least one negative electrode.

3. The battery cell according to claim 1, wherein the at least one positive electrode includes a plurality of positive electrodes and the at least one negative electrode includes a plurality of negative electrodes, each having a predetermined size which are sequentially stacked in a state in which separators are disposed respectively between the plurality of positive electrodes and the plurality of negative electrodes.

4. The battery cell according to claim 1, wherein the at least one positive electrode includes a plurality of positive electrodes and the at least one negative electrode includes a plurality of negative electrodes, each having a predetermined size which are sequentially stacked in a state in which separators are disposed respectively between the plurality of positive electrodes and the plurality of negative electrodes to constitute a unit cell, after which a plurality of unit cells is sequentially folded while being placed on a separation film.

5. The battery cell according to claim 1, wherein the at least first insulative material is provided over 50 to 70% of the entire area of the outer surface of the electrode assembly.

6. The battery cell according to claim 1, wherein the battery cell is a lithium secondary battery.

7. A device comprising one or more battery cells according to claim 1.

8. The device according to claim 7, wherein the device is any one selected from a group consisting of a cellular phone, a tablet computer, a laptop computer, a power tool, an electric vehicle, a hybrid electric vehicle, a plug-in hybrid electric vehicle, and a power storage apparatus.

* * * * *